United States Patent [19]
Troiani

[11] Patent Number: 5,213,397
[45] Date of Patent: May 25, 1993

[54] FREIGHT BRAKE CONTROL VALVE FOR RAILWAY CARS

[75] Inventor: Vincent F. Troiani, New Florence, Pa.

[73] Assignee: Westinghouse Air Brake Company, Wilmerding, Pa.

[21] Appl. No.: 803,836

[22] Filed: Dec. 9, 1991

[51] Int. Cl.⁵ .................. B60T 15/42; B60T 17/04
[52] U.S. Cl. ................................ 303/38; 303/37; 303/33
[58] Field of Search .............. 303/28, 33, 37–39, 303/69, 70, 80, 25–40

[56] References Cited

U.S. PATENT DOCUMENTS

| | | | |
|---|---|---|---|
| 2,156,720 | 5/1939 | Campbell | 303/70 X |
| 4,773,713 | 9/1988 | Rojecki | 303/69 X |
| 4,848,849 | 7/1989 | Epp et al. | 303/37 X |
| 4,974,910 | 12/1990 | Hart | 303/33 X |
| 5,071,198 | 12/1991 | Troiani | 303/37 |

Primary Examiner—Robert J. Oberleitner
Assistant Examiner—Josie A. Ballato
Attorney, Agent, or Firm—G. J. Falce

[57] ABSTRACT

A piston valve assembly for a freight brake control valve device in which axial displacement of a piston member is provided relative to its slide valve in response to slide valve friction creating excessive resistance to movement of the piston assembly from lap to release position. This relative movement between the piston member and slide valve causes a graduating valve that is carried fast with the piston member to open a release insuring passage in the slide valve and thereby exhaust auxiliary reservoir pressure from one side of the piston member. Accordingly, a relatively high pressure differential is created across the piston member to quickly overcome the slide valve resistance and assure prompt movement of the piston valve assembly and thereby obtain brake release without delay.

12 Claims, 3 Drawing Sheets

FREIGHT BRAKE CONTROL VALVE FOR RAILWAY CARS

BACKGROUND OF THE INVENTION

The present invention relates to pneumatic brake control valves for railway freight cars and particularly to an improvement thereof in terms of a release insuring feature.

Control valve devices, such as the well-known ABD type, employ a service valve assembly that is operable between brake release and application positions in accordance with the predominance of either brake pipe pressure that acts on one side of a piston member of the service valve assembly, or auxiliary reservoir pressure acting on the opposite side. The service valve assembly further includes a graduating valve that is carried by the piston member for direct movement therewith and a slide valve that is carried by the piston member with lost motion therebetween. Accordingly, relative motion exists between the graduating valve and slide valve during initial movement of the piston member in both the application and release directions, such relative motion effecting the valve connections as required to provide the various brake control functions of the service valve assembly.

A bias force in the form of a leaf spring that acts laterally on the slide valve provides face-to-face sealing pressure at the interface of the slide valve and its seat in the slide valve bushing. The slide valve is also pressed to its seat by air pressure. This combined spring and air load on the slide valve causes frictional resistance to movement of the slide valve, which the piston member encounters through its lost-motion connection with the slide valve during initial movement from release position toward application position, and again during movement of the piston member from application position toward release position. In the latter instance, the piston member encounters this resistance of the slide valve at a location intermediate release and application positions to establish a lap position of the piston member in which the supply and release of brake pressure is cut off.

This frictional resistance of the slide valve determines the differential force required to move the piston member from lap position to release position. Typically, this release differential corresponds to a 1.5 psi pressure differential by which the brake pipe pressure on one side of the piston exceeds the auxiliary reservoir pressure on the opposite side. This release differential is critical in terms of assuring a prompt release of the brakes on the cars of a train. It will be appreciated that the greater the release differential requirement to overcome the slide valve friction and effect movement of the piston member to release position, the greater the delay in effecting release of the train brakes. Factors that influence this frictional resistance include such variables as manufacturing tolerances, lap finish of the slide valve/bushing interfaces, wear of critical components, etc.

SUMMARY OF THE INVENTION

The object of the present invention, therefore, is to provide positive slide valve movement in response to a predetermined release pressure differential and thereby assure prompt release of a brake application on the cars of a train irrespective of such variables as influence frictional forces that resist slide valve movement.

In fulfillment of this objective, there is provided for controlling the brakes of a railway car having a brake pipe charged with compressed air and an auxiliary reservoir charged from the brake pipe, a control valve device comprising a housing, a first chamber in the housing connected to the brake pipe, a second chamber in the housing connected to the auxiliary reservoir, a piston valve assembly having a release position and an application position including a piston member between the first and second chambers movable in a first axial direction toward application position in response to a pressure differential between the first and second chambers in a first sense and movable in a second axial direction toward release position in response to a pressure differential between the first and second chambers in the opposite sense, valve means carried by the piston member for controlling the supply and release of braking pressure including a slide valve with which the piston member is engageable for effecting axial movement therewith in the second direction, and collapsible means between the piston member and slide valve for providing movement of the piston member in the second direction relative to the slide valve when the pressure differential in the opposite sense exceeds a predetermined value without corresponding movement of the slide valve, the valve means in response to the relative movement between the piston member and slide valve releasing pressure from the second chamber to thereby reinforce the pressure differential in the opposite sense.

This and other objects and advantages of the invention will become apparent from the following more detailed explanation when taken in conjunction with the accompanying drawings in which:

Figure 6:
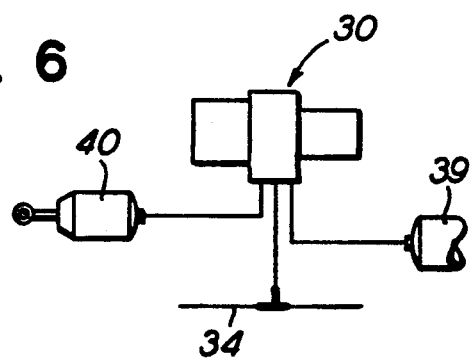
FIG. 6 is a schematic view showing a railway freight car brake system including a control valve device in which the service valve assembly of FIGS. 1-5 is incorporated.

A control valve device 30, which may be a well-known ABD/W type control valve modified in accordance with the present invention, is shown in FIG. 6 connected to the brake pipe 34 of a railway car (not shown). An auxiliary reservoir 39 is connected by piping to control valve device 30, as is a brake cylinder device 40 of the railway car. The air in auxiliary reservoir 39 is charged from the brake pipe during brake release and is supplied to the car brake cylinder 40 during a service brake application.

An improved service valve assembly 1, various positions of which are shown in FIGS. 1-5, is employed in control valve device 30 and includes a service piston 2, a bushing 3 having a bore 4 in which piston 2 is operably disposed, a slide valve 5 having one face 6 engageable with an adjoining face 7 of bushing 3 that forms a slide valve seat, and a graduating valve 8 having a face 9 engageable with another face 10 of slide valve 5.

Formed on opposite sides of piston 2 are pressure chambers 11 and 12, the former being connected to the railway car brake pipe (not shown) via a passage 13 and the latter being connected to an auxiliary reservoir (not shown) via a passage 14.

A stabilizing spring 15 is caged in the tail piece 16 of piston 2 between a spring guide 17 and a spring seat 18. Graduating valve 8 is carried fast in a recess 19 of piston 2, while slide valve 5 is carried in another recess 20 of piston 2, so as to have a lost-motion connection therewith. Spring guide 17 projects into recess 20 of piston 2 at the lower side of recess 21 and rests against a stop 22 in the piston tail piece. Being spring loaded, spring guide 17 is deflectable in an axial direction away from stop 22 upon engagement with slide valve 5 to provide the aforementioned lost-motion connection with piston 2. In accordance with this lost-motion connection between slide valve 5 and piston 2, desired port connections at the slide valve/graduating valve interface are established during movement of piston 2 from release position toward application position and from application position toward release position.

Figure 1:
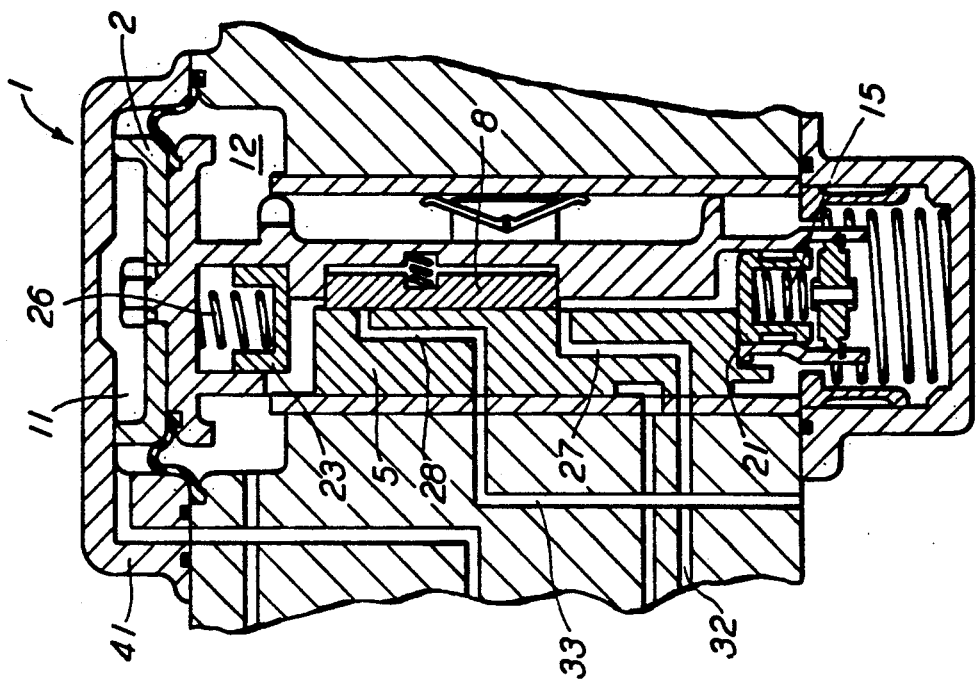
FIG. 1 is a fragmentary, diagrammatic view showing the release position of a service valve assembly of a railway car control valve, as modified in accordance with the present invention.
Figure 4:
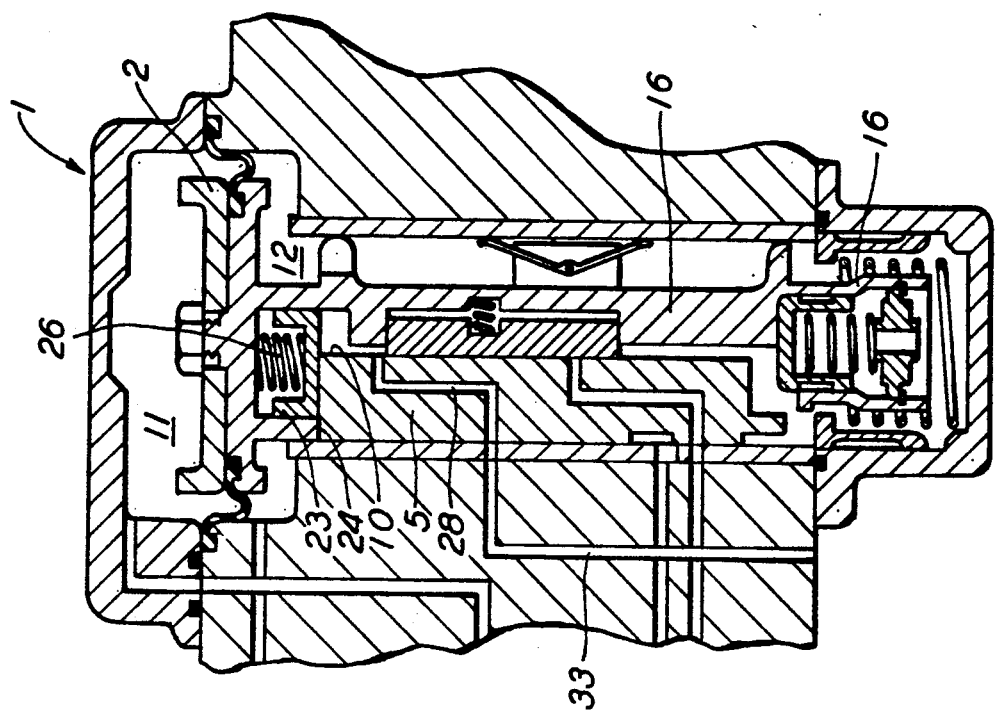
FIG. 4 is a fragmentary, diagrammatic view showing the service valve assembly of the present invention in initial release insuring position.

A further lost-motion connection between piston 2 and slide valve 5 is provided by a spring-loaded plunger 23 that is disposed in a cavity 23a of piston 2 and projects into recess 20 at the upper side 24. Plunger 23 rests against a stop 25 formed in piston 2 under the influence of a release insuring spring 26, which is caged under compression, as shown in FIG. 1. Plunger 23 is engageable with the upper side of slide valve 5 in lap position of piston 2 and is deflectable in an axial direction against the force of spring 26 when the slide valve friction becomes excessive, as shown in FIG. 4, the purpose being to establish a further port connection at the slide valve/graduating valve interface during the aforementioned lost-motion movement of piston 2 from lap position to release insuring position, for a reason hereinafter explained in accordance with the present invention.

Slide valve 5 includes an application passage 27 and a release insuring passage 28, both of which extend between slide valve faces 6 and 10, and a connecting slot or groove 29 in face 6. An exhaust passage 31 in the control valve body is connected from slide valve face 7 to atmosphere, while a delivery passage 32 in the control valve body is connected from slide valve face 7 to a brake cylinder device (not shown). An exhaust passage 33 in the control valve body is connected from face 7 of bushing 3 to atmosphere. In actual practice, this exhaust passage 33 could be the quick service passage of the ABD/W control valve device, which serves to vent brake pipe pressure during initial movement of piston 2 from release to application position by means of passages in slide valve 5 and graduating valve 8 that have been omitted for the sake of clarity.

Between graduating valve 8 and piston 2 is a helical spring 35 that provides sealing force at the graduating valve/slide valve interface to prevent leakage of compressed air thereat. Likewise, a leaf-type spring 36 between slide valve 5 and bushing 3 establishes a pressure seal at the slide valve/bushing interface. A roll pin 37 pivotally connects leaf spring 36 at its midpoint to a bifurcated lateral extension 38 of slide valve 5, in which the tail piece 16 of piston 2 is disposed for axial movement relative to slide valve 5 during lost-motion therebetween. The ends of leaf spring 36 bear against the inner diameter of bushing 3 under compression during axial movement of slide valve 5 with piston 2 following take-up of the aforementioned lost-motion therebetween, to establish and maintain the desired friction force with which face 6 of slide valve 5 engages face 7 of bushing 3 in order to provide the aforementioned pressure seal at the slide valve/bushing interface.

Figure 2:
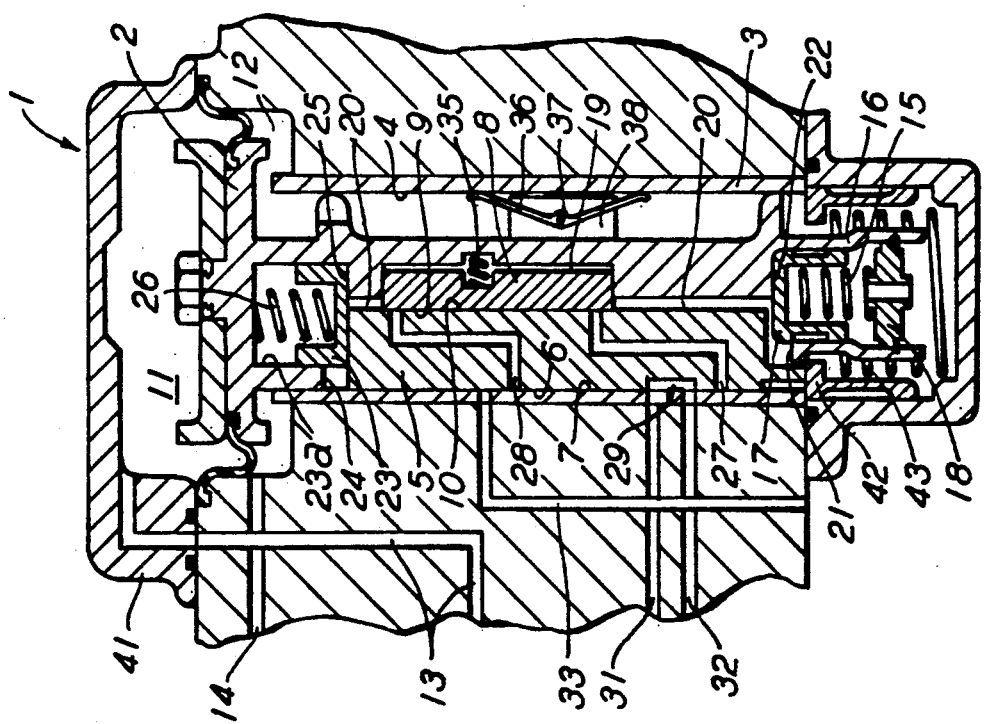
FIG. 2 is a fragmentary, diagrammatic view showing the service valve assembly of the present invention in application position.

A cover 41 encloses chamber 11 and provides a stop with which piston 2 is engageable to limit its upward travel and thereby establish service application position, as shown in FIG. 2. At the opposite end of piston 2, there is provided a spring seat 42 with which piston 2 is engageable to limit its downward travel and thereby establish release position, as shown in FIG. 1. Spring seat 42 abuts bushing 3 under compression of a spring 43 to normally maintain the spring seat location to establish this release position of piston 2, and deflects under a load greater than the force exerted by spring 43 to establish a retarded recharge position of piston 2 that forms no part of the present invention. The force exerted by spring 43, however, is generally sufficient to support a load on piston 2 corresponding to at least a predetermined pressure differential between chambers 11 and 12 at which movement of piston 2 from lap position (FIG. 3) to release position is intended to occur. Typically, this predetermined pressure differential, known as the "release differential", is 1.5 psi.

On the other hand, release insuring spring 26 is selected to deflect upon encountering a load in excess of 1.5 psi to ensure movement of piston 2 to release position at the desired "release differential", as will hereinafter be explained.

In release position of piston 2, as shown in FIG. 1, slide valve 5 is positioned by piston 2 acting through release insuring spring 26 and plunger 23 during the downward stroke of piston 2, so that slide valve application passage 27 is blanked by the graduating valve 8 at one end and by the slide valve seat in bushing 3 at the other end. In addition, delivery passage 32 is communicated with exhaust passage 31 via connecting groove 29 in slide valve face 6; and release insuring passage 28 is blanked at one end by graduating valve 8 and at the other end by slide valve seat 7 in bushing 3. In venting delivery passage 32 to atmosphere via exhaust passage 31, it will be appreciated that the brake cylinder pressure is released in a manner well-known to those skilled in the railway braking art. It will also be appreciated by those skilled in the art that concurrently with release of brake cylinder pressure, chambers 11 and 12 are charged with compressed air from the brake pipe (not shown). Chamber 11 is charged directly via passage 13, while chamber 12 and thus the auxiliary reservoir (not shown) are charged via a charging choke and passage in slide valve 5, the charging choke and passage arrangement being well-known and understood by those skilled in the art, so that the showing of such has been omitted for the sake of clarity.

Upon a subsequent reduction of brake pipe pressure to initiate a brake application, in a well-known manner, an upward acting pressure differential is created across piston 2 due to the direct connection of chamber 11 with the brake pipe, as opposed to the restricted communication of chamber 12 therewith. As this upward acting force moves piston 2 out of release position, stabilizing spring guide 17 encounters the lower end of slide valve 5, which exhibits resistance to movement, due to its frictional engagement with the slide valve seat provided by face 7 of bushing 3, in accordance with the lateral force exerted by leaf spring 36 and the air load behind the slide valve. This resistance to movement causes stabilizing spring 15 to compress, as piston 2 continues to move upwardly relative to slide valve 5 until side 21 of recess 20 engages the end of slide valve 5.

During this initial lost-motion travel of piston 2, graduating valve 8 uncovers application passage 27, which remains blanked at the slide valve/bushing interface until sufficient upward force is exerted by piston 2 to overcome the slide valve resistance. When this occurs the slide valve 5 is shifted to its application position, as defined by engagement of piston 2 with cover 41. In application position shown in FIG. 2, application passage 27 registers with delivery passage 32 to supply auxiliary reservoir pressure from chamber 12 to the car brake cylinder. Also, release insuring passage 28 registers at one end with passage 33 at the slide valve/bushing interface, but remains blanked by the graduating valve at its other end. It will be noted that in application position of piston 2, release insuring plunger 23 is displaced axially from the upper end of slide valve 5 a distance to assure that graduating valve 8 will cover the application passage 27, upon subsequent downward movement of piston 2 until release insuring plunger 23 engages the upper end of slide valve 5.

Figure 3:
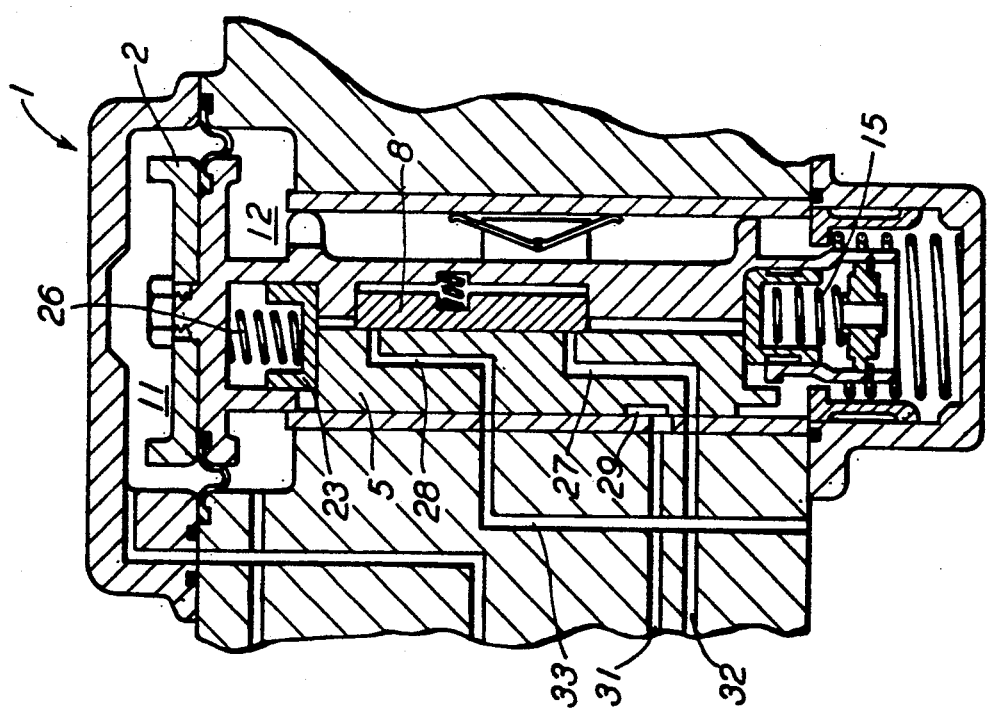
FIG. 3 is a fragmentary, diagrammatic view showing the service valve assembly of the present invention in lap position.

This reversal of piston travel in a downward direction toward a lap position is brought about by reason of the auxiliary reservoir pressure effective in chamber 12 being reduced, as this pressure feeds the brake cylinder. As the auxiliary reservoir pressure effective in chamber 12 approaches the reduced brake pipe pressure effective in chamber 11, the force exerted by compressed stabilizing spring 15 moves piston 2 downwardly until release insuring plunger 23 engages the upper end of slide valve 5. In this lap position of piston 2, graduating valve 8 covers application passage 27, thereby terminating the supply of auxiliary reservoir pressure to the brake cylinder via delivery passage 32. Also in this position of piston 2, compression of stabilizing spring 15 is relaxed so that with auxiliary reservoir pressure reduced essentially to the value of brake pipe pressure, piston 2 is force balanced to the extent that its continued downward movement is halted by engagement with slide valve 5, to thereby establish the aforementioned lap position, as shown in FIG. 3. In addition to application passage 27 being blanked by graduating valve 8 in this lap position to terminate the further buildup of brake cylinder pressure, exhaust passage 31 is blanked by slide valve connecting groove 29, and release insuring passage 28 is blanked by graduating valve 8. Accordingly, the release of brake cylinder pressure is prevented until such time as brake pipe pressure is subsequently increased to establish a positive downward-acting release pressure differential between chambers 11 and 12.

This positive release differential occurs when brake pipe pressure is increased 1.0–1.5 psi above auxiliary reservoir pressure, thereby creating sufficient force across piston 2 to overcome the normal frictional resistance against movement offered by slide valve 5.

Release insuring spring 26 is selected so that in its caged condition between piston 2 and plunger 23 the spring exerts sufficient force to overcome the normal resistance with which slide valve 5 resists movement of piston 2 without compressing. It will be appreciated, therefore, that in the case of slide valve 5 having normal frictional resistance, piston 2 and slide valve 5 move downward to release position, as shown in FIG. 1, as a unitary assembly, i.e., without any relative movement due to the absence of compression of spring 26.

Figure 5:
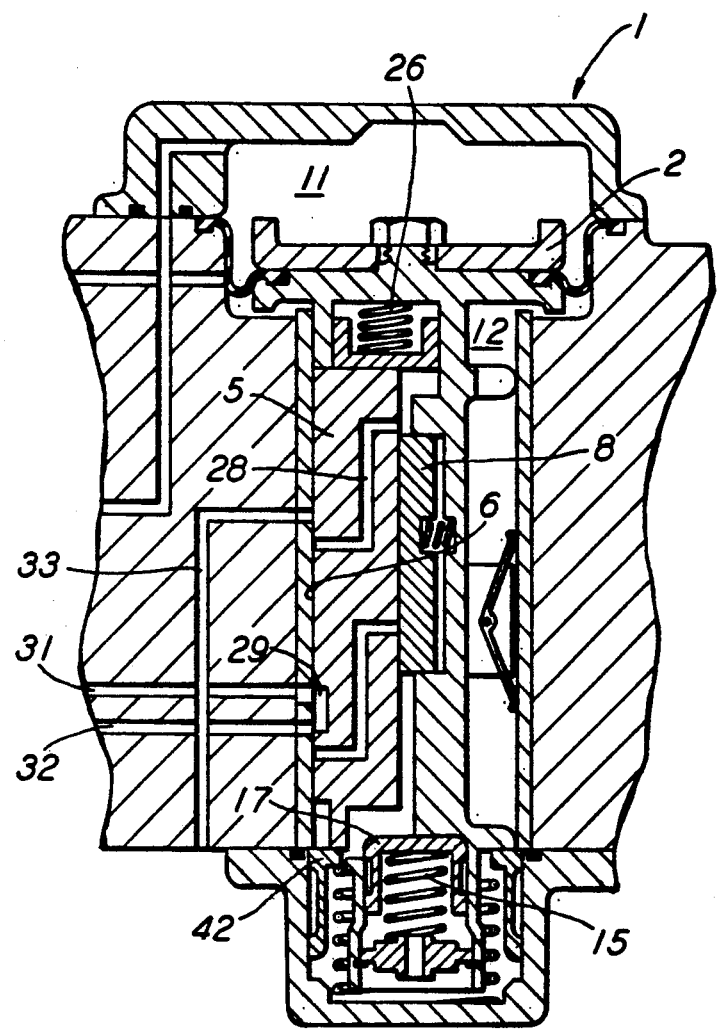
FIG. 5 is a fragmentary, diagrammatic view showing the service valve assembly of the present invention in final release insuring position.

In the event the frictional resistance of slide valve 5 is abnormally high, such as to require a release differential between chambers 11 and 12 greater than the desired 1.0–1.5 psi, in order to actuate piston 2, spring 26 will be unable to support this abnormally high load, thus becoming compressed to allow downward movement of piston 2 through collapse of plunger 23, as shown in FIG. 4. The resultant relative movement between piston 2 and slide valve 5 is limited to a predetermined distance as determined by the space between the side 24 of recess 20 in piston 2 and the upper side of slide valve 5 to establish this initial release insuring position. The downward movement of piston 2 relative to slide valve 5 also shifts graduating valve 8 downwardly relative to slide valve 5, the predetermined distance being such that graduating valve 8 uncovers the release insuring passage 28 at slide valve face 10. Auxiliary reservoir air in chamber 12 is thus connected from the cavity surrounding the piston tailpiece 16 to passage 33 leading to atmosphere. In this manner a relatively fast drop in auxiliary reservoir pressure effective in chamber 12 is realized, thereby creating a sufficiently high pressure differential across piston 2 to overcome the abnormally high frictional resistance offered by slide valve 5. Being in direct engagement with slide valve 5 in this initial release insuring position following take-up of the lost-motion between piston 2 and slide valve 5, the piston valve is conditioned to move as a unitary assembly from lap to final release insuring position, as shown in FIG. 5.

During downward movement of slide valve 5 from initial release insuring position to final release insuring position, the connection between release insuring passage 28 and passage 33 is cut off at the slide valve/bushing interface to terminate any further venting of auxiliary reservoir pressure. The downward deflection of slide valve 5 and piston 2 is limited by engagement of the underside of slide valve 5 with spring seat 42 to establish this final release insuring position, as shown in FIG. 5.

In this final release insuring position, slide valve connecting groove 29 in face 6 establishes registry between brake cylinder passage 32 and exhaust passage 31 to release the brake cylinder pressure, such brake release in accordance with the present invention being relatively prompt irrespective of such variables as slide valve friction that influence slide valve resistance and thus tend to delay piston actuation to release position.

As the system subsequently approaches full re-charge following release insuring, the brake pipe/auxiliary reservoir pressure differential across piston 2 is reduced sufficiently that the compressed release insuring spring 26 is effective t shift piston 2 upwardly relative to slide valve 5 until spring guide 17, supported by stabilizing spring 15, engages the underside of slide valve 5 to establish release position, as shown in FIG. 1. This upward movement of piston 2 relative to slide valve 5 causes graduating valve 8 to cover release insuring passage 28 while continuing to cover application passage 27 at slide valve face 10 and thereby condition the piston valve assembly for a subsequent cycle of operation.

What is claimed is:

1. A control valve device for controlling the brakes of a railway car having a brake pipe charged with fluid at a certain chosen pressure and an auxiliary reservoir charged with fluid under pressure from said brake pipe, said control valve device comprising:
   (a) a housing;
   (b) a first chamber in said housing to which said brake pipe is connected;
   (c) a second chamber in said housing to which said auxiliary reservoir is connected;
   (d) a piston valve assembly having a release position and an application position including:
      (i) a piston member between said first and second chambers movable in a first axial direction toward said application position in response to a pressure differential between said first and second chambers in a first sense and movable in a second axial direction toward said release position in response to a pressure differential between said first and second chambers in a sense opposite said first sense;
      (ii) valve means carried by said piston member for controlling the supply and release of braking fluid pressure, said valve means including a slide valve with which said piston member is engageable for effecting axial movement therewith in said second axial direction; and
   (e) collapsible means between said piston member and said slide valve for accommodating movement of said piston member in said second axial direction relative to said slide valve when said pressure differential in said opposite sense exceeds a predetermined value without said piston member effecting corresponding movement of said slide valve, said valve means in response to said relative movement between said piston member and said slide valve effecting a release of fluid under pressure from said second chamber to thereby reinforce said pressure differential in said opposite sense.

2. A control valve device, as recited in claim 1, wherein:
   (a) said piston member includes a first recess in which said slide valve is carried, one side of said recess having said collapsible means; and
   (b) said valve means further including:
      (i) a graduating valve carried by said piston member for direct movement therewith, said slide valve having one face and said graduating valve having an adjoining face slidably engageable with each other; and
      (ii) a release insuring passage in said slide valve having one end opening in said one face of said slide valve, said adjoining face of said graduating valve covering said one end of said release insuring passage except when said collapsible means provides said movement of said piston member in said second direction relative to said slide valve.

3. A control valve device, as recited in claim 2, wherein said piston member further includes a second recess formed in said first recess, said graduating valve being disposed in said second recess fast with said piston member to provide said direct movement therewith.

4. A control valve device, as recited in claim 3, further comprising:
   (a) a bore in said housing opening into said second chamber; and
   (b) said piston member including a tailpiece operatively disposed in said bore for axial movement therein, said first and second recesses being formed in said tailpiece of said piston member, whereby said adjoining face of said graduating valve and said one face of said slide valve are in fluid pressure communication with said auxiliary reservoir.

5. A control valve device, as recited in claim 3, further comprising:
   (a) a valve seat in said bore, said slide valve having another face opposite said one face slideably engageable with said valve seat, said release insuring passage having its other end opening in said other face of said slide valve; and
   (b) a vent passage in said housing between said valve seat and atmosphere, said piston valve assembly having a lap position intermediate said release and application positions in which said slide valve is axially located relative to said valve seat such as to establish registry between said release insuring passage and said vent passage.

6. A control valve device, as recited in claim 5, wherein said collapsible means comprises:
   (a) a cavity in said piston member opening into said first recess at said one side thereof;
   (b) a plunger disposed in said cavity for axial movement therein; and
   (c) a spring in said cavity between said piston member and said plunger.

7. A control valve device, as recited in claim 6, wherein said collapsible means further comprises a stop on said piston member, said plunger normally engaging said stop such that said spring is caged between said piston member and said plunger.

8. A control valve device, as recited in claim 7, wherein said spring at said caged height exerts a force sufficient to support a load corresponding to said predetermined value of said pressure differential.

9. A control valve device, as recited in claim 8, wherein said registry of said release insuring passage with said vent passage is cut off at the interface of said slide valve and said valve seat in said release position of said piston valve assembly.

10. A control, valve device, as recited in claim 8, wherein said one side of said first recess is axially spaced from said stop of said piston member a predetermined distance that is at least as great as the distance between said one end of said release insuring passage and one end of said graduating valve when said piston valve assembly is in said lap position.

11. A control valve device, as recited in claim 10, further characterized in that said piston valve assembly has a release insuring position intermediate said lap and release positions wherein said piston member is displaced in said second axial direction relative to said slide valve said predetermined distance in response to said pressure differential in said opposite sense exceeding said predetermined value.

12. A control valve assembly, as recited in claim 11, wherein said slide valve in said lap position of said piston valve assembly is located axially in said bore such that said other end of said release insuring passage is registered with said vent passage.

* * * * *